May 11, 1948.     H. H. CHARLES ET AL     2,441,136
KEYING DEVICE FOR AVIATION GROUND TRAINER SIGNALING EQUIPMENT
Filed Aug. 4, 1945     4 Sheets-Sheet 1
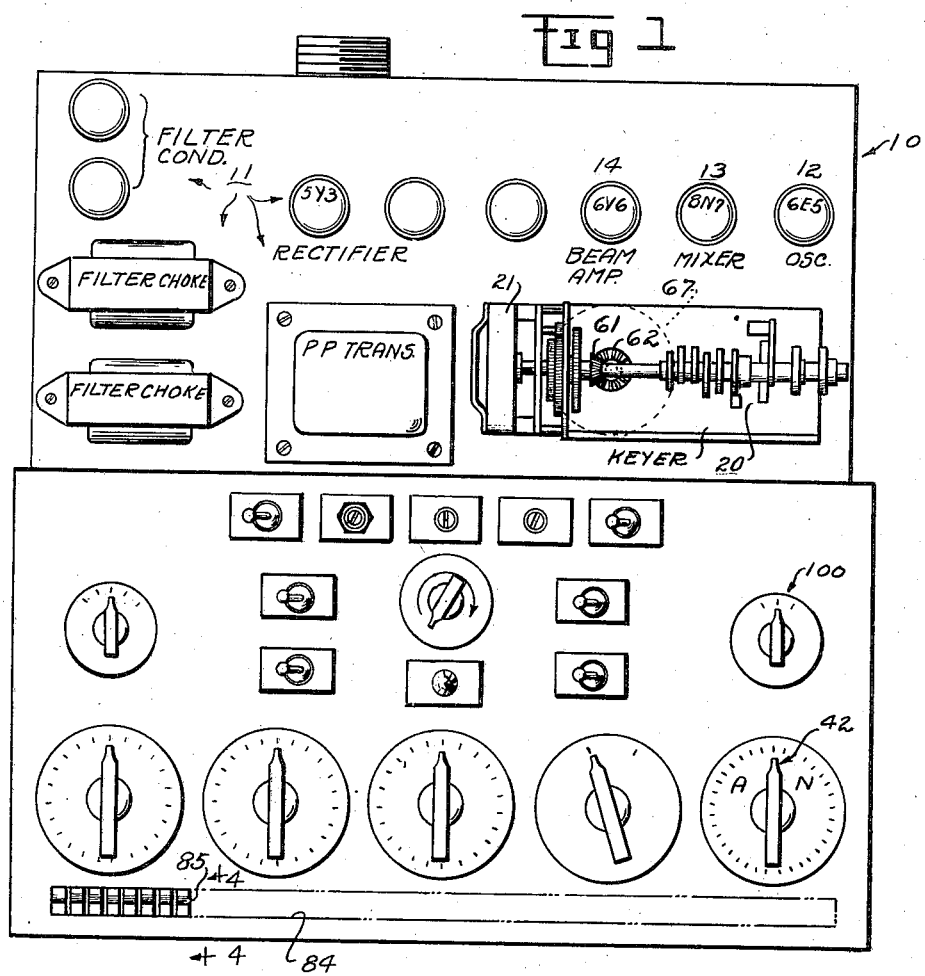
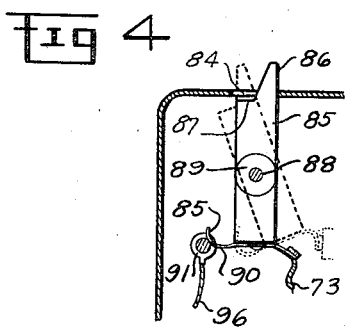
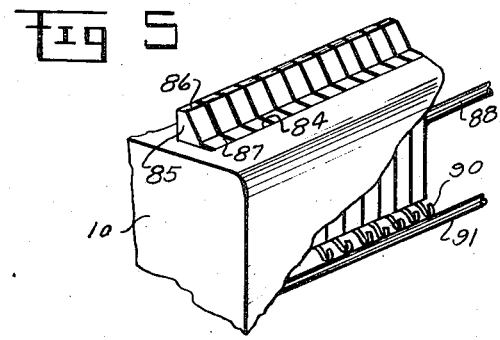
INVENTORS
HAROLD H. CHARLES
HERBERT P. BEHLEN
BY
ATTORNEYS May 11, 1948. H. H. CHARLES ET AL 2,441,136
KEYING DEVICE FOR AVIATION GROUND TRAINER SIGNALING EQUIPMENT
Filed Aug. 4, 1945 4 Sheets-Sheet 2

INVENTOR.
HAROLD H. CHARLES
HERBERT P. BEHLEN
BY

*Wade Koonty*
*Raymond J. Crowley* AND
ATTORNEYS

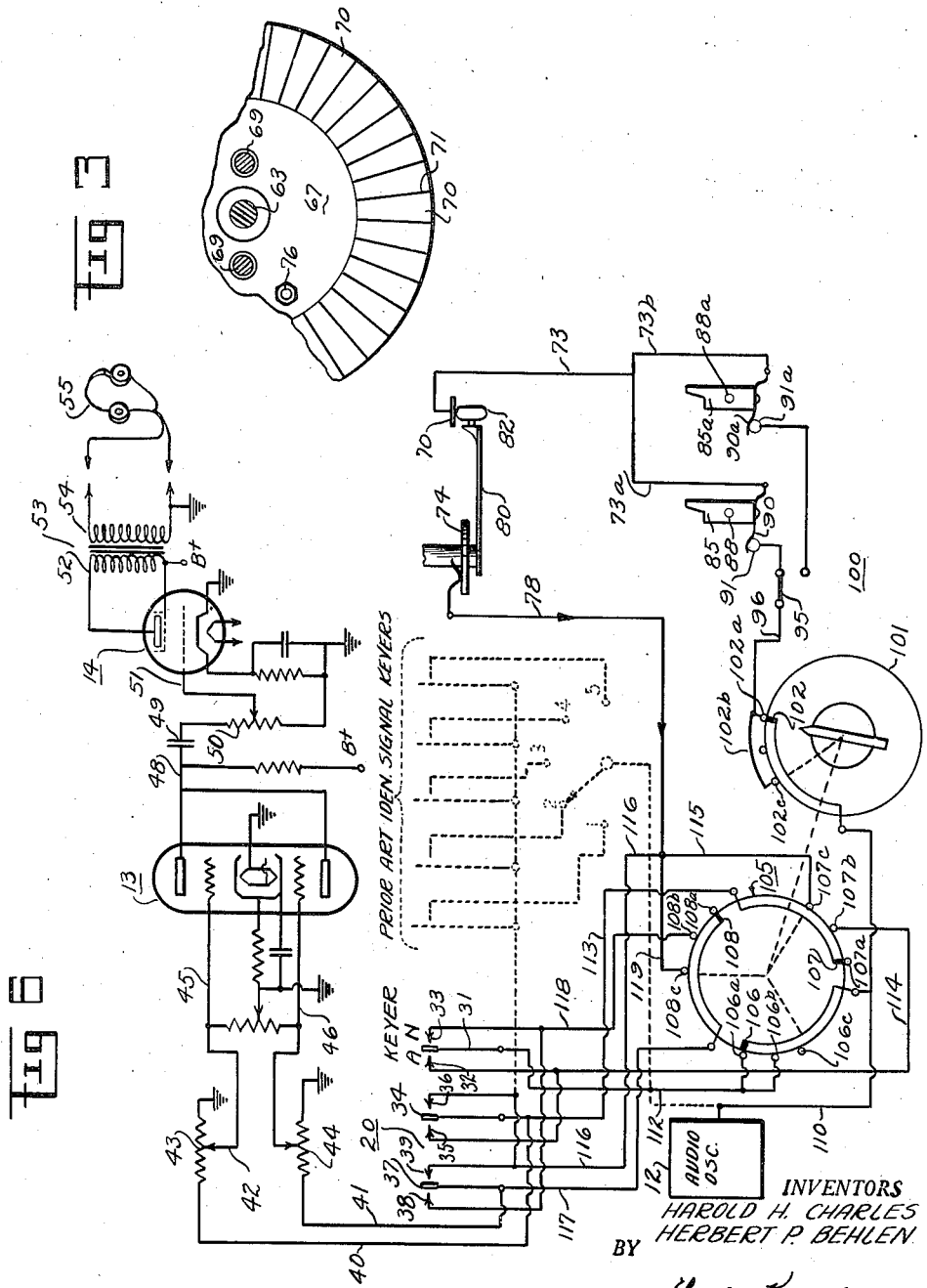

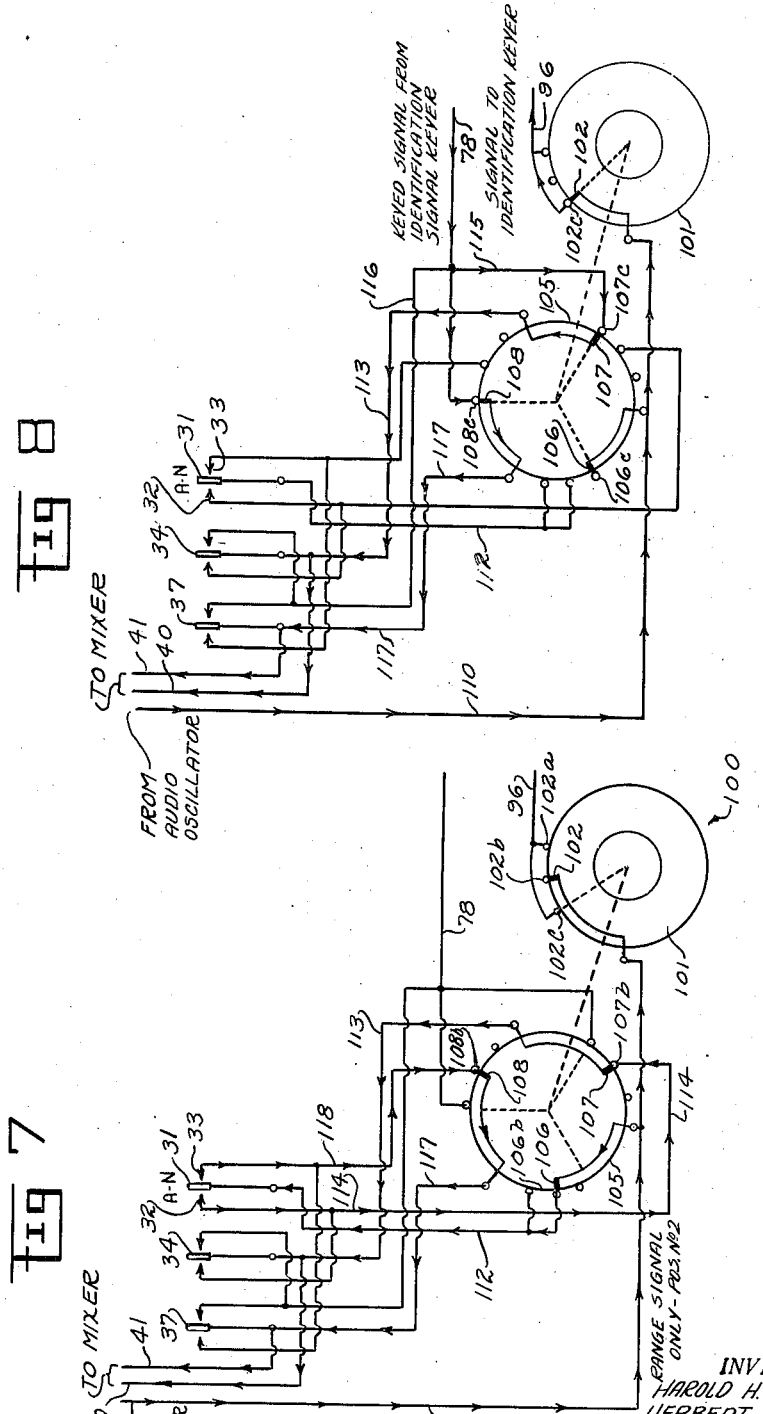

Patented May 11, 1948

2,441,136

UNITED STATES PATENT OFFICE 2,441,136

KEYING DEVICE FOR AVIATION GROUND TRAINER SIGNALING EQUIPMENT

Harold H. Charles, Virden, Ill., and Herbert P. Behlen, Columbus, Nebr.

Application August 4, 1945, Serial No. 609,005

2 Claims. (Cl. 177—380)

(Granted under the act of March 3, 1883, as amended April 30, 1928; 370 O. G. 757)

The invention described herein may be manufactured and used by or for the Government for governmental purposes without the payment to us of any royalty thereon.

This invention relates to improvements in keying devices for radio range signalling equipment employed with aviation ground training apparatus.

At present aviation ground trainers such as the well known "Link" trainer employ signalling equipment for transmitting radio range signals to the trainer occupant either by manual actuation of a signal control in accordance with the observed position of a course recorder with respect to a radio range signal pattern on a recorder chart, or automatically by means of a pickup antenna mounted on the course recorder and movable in a miniature radio range signalling field set up over the recorder table, such as disclosed in U. S. Patent 2,352,216 to Melvin et al.

In the above types of signal generating equipment an automatic keying assembly is employed having a cam actuated keyer for A and N signals, a series of identification signal keyers and timing cam actuated switches to automatically cut out the A-N keyer and switch in the preselected identification keyer at certain periodic intervals. The character of the identification signals are limited in number to the number of cams employed and cannot be changed without disassembling the keyer unit and changing cams. With the conventional equipment there is no difficulty in simulating or duplicating any radio range desired but the corresponding range identification signal cannot be given unless the identification signal corresponds to the signal for one of the keyer cams.

In accordance with the present invention the identification signal keyers are removed from the radio chassis signal keyer unit and replaced by a special rotary keyer switch which is driven at a constant speed by the keyer motor drive. The rotary keyer switch includes a plurality of circuit contacts arranged similar to a disc commutator on an insulating base, the contact segments being electrically insulated from each other and each connected to a respective manually actuated switch. A rotary contact sequentially engages the contact segments and allows the signal to pass through the contact segments which are not open circuited. By selectively closing certain circuits through the segments any desired identification signal may be passed and the identification signal may be changed at any time by manipulation of the switches.

In accordance with the invention a three position control switch is also provided which in one position permits the usual transmission of radio range signals followed by identification signals, in another position permits only the radio range signals to pass and in a third position permits only the identification signals to pass to thereby simulate a radio compass homing marker station.

The principal object of the invention is to provide a keying device for aviation ground training equipment which permits the character of the signals to be altered as desired during operation of the apparatus.

It is another object of the invention to provide a radio range signalling device for use in aviation ground training equipment in which radio range signals, identification signals or both may be selectively given and in which the character of the identification signals may be altered as desired.

Other objects and features of the invention will become apparent by reference to the detailed description hereinafter given and to the appended drawings, in which:

Fig. 1 is a top plan view of a ground trainer signalling apparatus incorporating the invention;

Fig. 3 is a fragmentary bottom view of the switching device of Fig. 2.

Fig. 4 is a view taken on line 4—4 of Fig. 1 and illustrates the construction of the manually actuated key controlled switches;

Fig. 5 is an isometric view further illustrating the manually actuated switch keys of Fig. 4;

Fig. 6 is a schematic circuit diagram of a signalling system incorporating the invention, and having a control switch set in a first position whereby sequential radio range and identification signals may be transmitted;

Fig. 7 is a partial view of the circuit of Fig. 6 with the control switch arranged in a second position such that only radio range signals may be transmitted.

Fig. 8 is a view similar to Fig. 7 showing a circuit arrangement with the control switch in a third position whereby only identification or homing marker signals may be transmitted.

Figure 2:
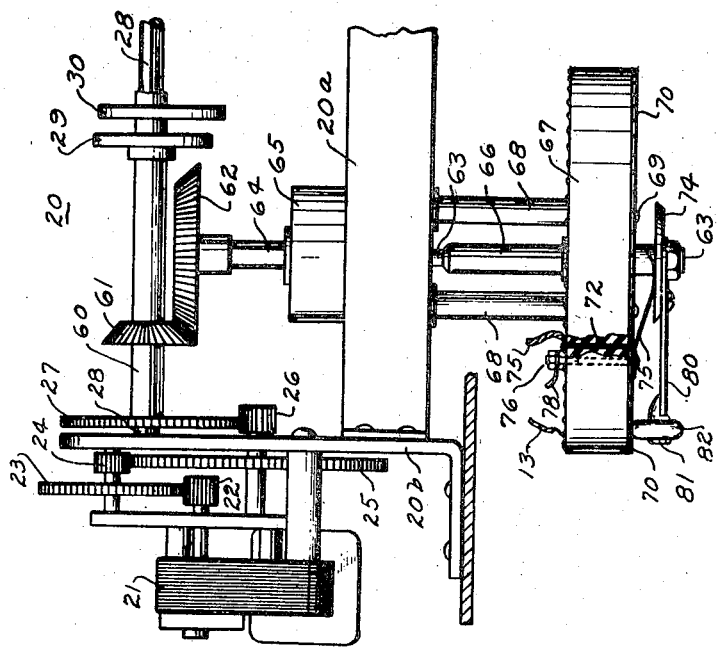
Fig. 2 is a view partly in section taken on line 2—2 of Fig. 1, illustrating construction and drive of a rotary keyer device employed in the invention.

Referring now to Fig. 1, reference numeral 10 generally indicates a radio signal chassis of a character now generally employed with "Link" trainers and constitutes an improved form of the device shown in U. S. Patent 2,110,869 to C. J. Crane and U. S. Patent 2,119,083, granted to Edwin A. Link, Jr. While a radio signal chassis of the type illustrated in Fig. 1 has been in use for a number of years and is not novel per se, the general arrangement of the same will now be briefly described for a better understanding of the present invention. The chassis includes the power supply section, generally indicated by reference numeral 11, which includes the usual transformer, rectifier tube, chokes and filter condensers as are well known in the art, and which are adapted to supply the direct current voltages for vacuum tube plate and filament circuits. The chassis also includes an oscillator section including the vacuum tube 12, an amplifying and mixer section indicated by vacuum tube 13 and a beam signal amplifier indicated by the vacuum tube 14. A continuous audio frequency signal is generated by the oscillator section and is automatically keyed by a keyer unit 20 which comprises a constant speed motor 21, which is adapted to drive a cam shaft having a plurality of keying and switching cams mounted thereon with the switching cams being actuated through a ratchet drive such that the oscillator output may be keyed alternately for an A signal and N signal to the corresponding sides of the mixer tube for a period of thirty seconds. Then the A-N signal keyer is cut out and an identification signal is transmitted for a period of five seconds which may be any one of five signals as determined by five identification signal cams provided. In accordance with the present invention the identification signal cams are removed and a separate identification signal keying device is employed. The chassis is also provided with the well-known manually controlled dual potentiometer unit indicated by reference numeral 42 which may be actuated to give the A and N radio range signals with equal or varying intensity and is operated by the instructor in accordance with the observed position by the course recorder on a radio range chart as is well known in the art. In accordance with the present invention, the identification signal keyer device is driven from the constant speed motor 21 and, in turn, its function is controlled through a special manually actuated three-position duel switch unit, generally indicated by the reference numeral 100. In accordance with the present invention, the chassis is also provided with a plurality of switches manually actuated by handles or keys 85 for controlling the identification signal keyer so that any combination of code signals may be set up providing that the number of letters and spaces does not amount to more than forty, the number of manually actuated keys provided. By means of this chassis, any predetermined identification signals may be set up by actuation of the keys 85 so that the identification signals will be transmitted to headphones worn by the occupant of the ground trainer during such time as the identification signal is on. In place of the single row of keys illustrated in Fig. 1, one or more additional standby banks of keys may be employed with a suitable transfer switch, not shown, so that rapidly shifting from one identification signal to another may be readily accomplished.

For a more complete understanding of the principles of operation of the prior art signal device, reference is made to a portion of Fig. 6 in which it is seen that audio oscillator 12 may supply its output through identification signal keyer circuits indicated in dotted lines which are not employed in the present invention. The audio signal is adapted to be keyed for A-N signals by means of a keyer including cam actuated contact 31 which engages contact 32 to give A signals and contact 33 to give N signals when actuated by a suitable cam well known in the art. Similarly, cam-actuated switching devices 34 and 37 are so arranged than when contact 34 engages contact 35, the A signal may be transmitted through conductor 40, while when contact 37 engages contact 38, the N signal is transmitted through conductor 41. When switch contacts 34 and 37, respectively, engage associated contacts 36 and 39, the prior art identification signal keyers would become operative to transmit the identification signal through the respective A and N sides of the mixer tube alternately through conductors 40 and 41. The conductors 40 and 41 are respectively connected to variable potentiometers 43 and 44 which form a single manually actuated unit 42 indicated in Fig. 1 by adjustment of the potentiometers in the opposite directions. The relative strength of signals may be varied to give the proper radio range simulation. After attenuation in potentiometers 43 and 44, signals may pass through either of conductors 45 or 46 on to the control grids of the double triode mixer tube 13, the plates of which are connected in parallel to an output conductor 48. The output voltage from the mixer circuit will pass by way of condenser 49 and adjustable grid rheostat 50 and conductor 51 to the control grid of the amplifier tube 14. The amplified signal output of the tube 14 appears in the primary winding 52 of a coupling transformer 53, the secondary 54 of which is connected to headphone sets such as indicated at 55, one pair of which are respectively worn by the instructor and the student receiving training.

The circuit portion of Fig. 6 so far described does not form per se a part of the present invention and as previously noted, the prior art identification signal keyers illustrated in dotted lines in Fig. 6 are not employed in the present invention but are replaced by a keying device illustrated in Fig. 2 which will now be described.

Referring now to Fig. 2, the automatic keyer device generally indicated by the reference numeral 29 includes a constant speed motor 21 adapted to drive, by means of reduction gears 22, 23, 24 and 25, a pinion gear 26 which, in turn, drives a large gear 27 which is rigidly mounted on a cam shaft 28 suitably keyed or splined to drivingly rotate identification signal, radio range and switching cams, two such cams 29 and 30 only being shown. The cams are adapted to actuate suitable control switches to perform their required function. As previously described with reference to Fig. 1, the prior art radio signal keyer was provided with five cam actuated identification signal keyers, any one of which could be selected by means of a manually actuated control switch and controlled automatically to sequentially follow the radio range signals in a manner well known in the art.

In accordance with the present invention the identification signal cams have been removed and replaced by a sleeve 60 suitably keyed to the cam shaft 28 and having a bevel gear 61 mounted thereon which meshes with a larger bevel gear 62 to drive a vertical shaft 63 for actuating the keyer. The drive ratio between gears 61 and 62 is two-to-one so that shaft 63 rotates at half the speed of cam shaft 28 and this ratio of gears has been selected so as to increase the time period for identification signals from five seconds as presently used to ten seconds which is more nearly equal to the period actually in use on radio ranges. The shaft 63 extends through a bearing bushing 64 which is mounted on an insulating member 65 which is positioned on the upper side of spaced parallel frame members 20a of the keyer unit and the shaft 63 extending between the frame members. The lower end of the shaft 63 is rotatably journaled in a bearing bushing 66 which is seated in a disc 67 which, in turn, is supported by means of the tubular struts 68 and screws 69 so that the entire assembly is rigidly clamped to the keyer frame members 20a. The disc 67 is made of phenolformaldehyde synthetic resin or other suitable insulating material and is provided on its lower face with a plurality of segmental copper contacts 70 (see also Fig. 3) which are separated by insulators 71 in the same manner as a disc commutator and are riveted to the disc by means of pins 72 so that the general arrangement of the disc and contacts is similar to a plate disc commutator employed in electric motors. Each respective switch contact segment 70 has one of its associated pins 72 connected to a flexible conductor lead 73 and the total number of segments employed (forty) with a separate conductor 73 for each segment. The disc 67 is suitably apertured for passage of the shaft 63 therethrough, as illustrated in Fig. 3, and has a head secured to its lower end which includes a contact disc 74 which is rotatable with shaft 63 and engages a flexible metallic brush 75, the brush being secured to the insulating disc 67 by means of a bolt 76 to which a conductor 78 is connected. A switch arm 80 is secured to the contact plate 74 so as to rotate therewith and is provided with a pivot pin 81 at its outer end upon which is mounted a contact roller 82 so that as shaft 63 is rotated signal current may pass sequentially through one or more of the contact segments 70, through the contact roller 82, arm 80, contact plate 74 and brush 75 to conductor 78.

It will be readily understood that if a continuous audio signal is applied from a suitable signal source by means of manually actuated selector switches to certain of the conductors 73, the contact roller 82 will conduct current whenever it engages the contact segments 70 which have the signal voltage impressed thereon and the signal current may be transmitted via the conductor 78 to the amplifying apparatus. If, for example, three adjacent contact segments are energized, the contactor 82, in passing thereover, would key the signal input to give the equivalent of a Morse code dash, if then next the roller 82 engaged an open contact segment 70, no signal would be given; and if the roller then engaged a single live contact segment 70, the signal input would be keyed to form a Morse code dot. As in the case of a commutator the insulating material 71 is slightly undercut allowing the roller 82 in passing from one segment to the next in the case of a dash to bridge the gap between the segments without opening the circuit. By suitably applying the signal input voltages to individual or groups of the contact segments 70 in spaced relation, the contact roller 82, as it passes over the live contacts spaced by individual or groups of dead contact segments, will key the signal input to give any desired code output signal providing that the total number of dots and dashes with spaces therebetween do not exceed the number of contact segments 70 provided on the disc 67.

The signal input to the keyer contact segments 70 may be selected to give any desired output signal by actuation of key control switches such as illustrated in Figs. 4 and 5. As seen in these figures, the radio chassis 10 is provided with a slot or opening 84 extending across the width of the chassis adjacent the front edge thereof, through which a plurality of switch actuating keys 85, which are forty in number, project. The keys have an upwardly extending gripping portion 86 and visible flat portion 84 which is adapted to be painted white and visible to the eye only when the keys are in a contact closed position as shown in Fig. 5. When the keys are moved forward to the dotted line position in Fig. 4, the painted portions 84 will not be visible which indicates that the corresponding circuit through the respective key is open. When three or more keys are moved from the dotted line to the full line or contact position of Fig. 4, the successive white squares form a dash, which corresponds to the audible dash signal heard in the headphones. Similarly, one key in the contact closed position creates a visible and audible dot. One key in the open position produces the visible and audible space between dots and dashes forming a code letter and three or more keys in the open position produce the visible and audible interval between letters. For example, the identification signal for range station KCZ Seattle, Washington, is the letters SA or (. . .) (. _). This signal would be set up by moving three keys 85 to the contact closed position with two intermediate keys in contact open position to give the letter S. The next three or more keys would be left in contact open position to give the interval between letters. The letter A would then be set up by moving the next key to contact closed position the following key left in contact open position and the next three successive keys moved to contact closed position. All other keys of the assembly would be placed in contact open position, so that if the signal is correctly set up, the code combination of letters will be visible on the keyboard and any error will be immediately apparent.

The keys 85 are mounted for pivotal movement on a shaft 86 which extends across the chassis and is suitably supported by means not shown. Between each individual pair of keys a friction washer 89 is provided so that the keys will retain their adjusted position without requiring the use of a snap action mechanism. On their undersides the keys are each provided with a flexible phosphor bronze switch contact 90 which is adapted, when the keys are in an upright position, to engage the contact rod 91 which extends across the chassis parallel to the shaft 88. Each of the switch contacts 90 is adapted to be connected to a respective one of the contact segments 70 by means of one of the leads 73 so that signal input from a conductor 96 may pass from the contact rod 91 through any of the engaging contacts 90 to the corresponding contact segments 70 of the keyer device of Fig. 2. By opening all of the switches except those individual and groups of switches required to form a particular code signal only that signal will be formed by the keyer device. At any time, at the will of the operator, he may rearrange the keys 85 to give a different signal so that during the operation of the trainer problem the correct identification signal, corresponding to the radio range chart being employed, may be transmitted and the range identification signal may be changed during the conduct of the problem to that corresponding to another station where multiple range problems are being solved. Further, the identification signal may be changed each time a different chart is substituted, with the advantage that the transmitted signal will always correspond exactly to the range rather than being limited to any one of five different identification signals, none of which may correspond to the range being simulated. This keying device may also be employed to familiarize students with code practice through a suitable switch such as switch 100 so that various letter combinations may be transmitted to the student as well as code letters for practice purposes, which is not possible with the equipment at present being used.

It has been found that with some practice the instructor may readily change from one identification signal to another in thirty-second intervals, during which the A-N signals are being transmitted, but to avoid confusion the switch 100 is provided so that the instructor may switch continuously to range signals during the interim in changing from one identification signal to another so as to avoid confusing the student. This switch also permits the transmission of continuous signals simulating those received from radio compass homing marker stations, a number of which are employed on the airways for radio compass homing and bearing stations.

The circuit connections of the keyer device and switch 100 will be best understood by again referring to Fig. 6. In this figure it is seen that two sets of key actuated switches are provided and connected in parallel, one set being that as illustrated in Fig. 1 and the second set of identical construction being identified by the same reference numerals with the subscript a applied. These switches, in turn, may be optionally connected by means of a selector switch 95 to a signal input conductor 96 so that while a signal is being keyed in accordance with the setting of one bank of keys, the other bank of keys 85a may be set up for a second signal, and by operation of a switch 95 the first bank of key switches will be cut off and the second placed in the circuit so that no interruption or confusion will result in changing from one identification signal to another. This form of construction is, however, purely optional and with a skilled operator is not required. The input signal from conductor 96 will pass through those of the switch contacts 99 engaging the contact rod 91 and will be transmitted by means of conductors 73 or conductors 73a to the selected contact segments 70, and engagement thereof by the contact roller 82 will key the signal input and deliver the same to output conductor 78. The continuous audio signal output of audio oscillator 12 is transmitted by means of a conductor 110 to the conductor 96 through one unit 101 of a two-unit, three-position, manually actuated switch, generally indicated by the reference numeral 100. The switch unit 101 includes a contact 102 connected to the input lead 110 from oscillator 12 and adapted to engage either of three associated contacts 102a, 102b and 102c, the first and last of which are connected in parallel to the conductor 96, while the other, 102b, is electrically dead. Thus, whenever rotary contact 102 engages either contacts 102a or 102c an input signal will be transmitted through conductor 96 onto the keying device, while when the switch is in a position such that contact 102 engages contact 102b, the identification signalling device will be cut out.

The second switch unit 105 actuated in common with the switch unit 101 and forming a part of the switch assembly 100, is provided with three rotatable wiping contacts 106, 107 and 108, respectively, each of which contacts have a series of three contacts associated therewith and identified by the same reference numeral with the subscripts a, b and c, respectively, appended. Of the first group contact 106c, of the second group contact 107a, and of the third group contact 108a are electrically dead. The stationary contacts 106a and 106b of the first group are connected in parallel by means of a conductor 112 to the movable contact 31 of the A-N keyer device. Movable contact 106 is connected to the signal input lead 110 so that the audio signal input will appear on rotary contact 106 and may be transmitted to the A-N signal keyer by means of conductor 112 whenever contact 106 is in a first or second position engaging either of contacts 106a or 106b, respectively. Rotatable contact 107 of the second group is connected by means of a conductor 113 to the movable contact 34 of the cam actuated switch, while stationary contacts 107b and 107c associated therewith are connected, respectively, by means of conductor 114, to the A signal contact 32 of the A-N keyer device and to contact 35 of the switch 34, while contact 107c is connected by means of conductor 115 to conductor 78 which, in turn, is connected to stationary contact 108c of the third group of contacts so that the keyed signal output of the identification signal keying mechanism appears on either of contacts 107 and 108c.

The keyed signal output conductor 78 is also connected by means of conductor 116 to contacts 36 and 39 of the cam actuated switches 34 and 37. Of the third group of contacts on switch 105, rotatable contact 108 is connected by means of conductor 117 to the movable contact of switch 37, and stationary contact 108b is connected by means of conductor 118 to the N signal contact 33 of the A-N keyer device, which also has contact 38 of the cam actuated switch 37 connected in parallel therewith.

With the switch 100 set in the first position as shown in Fig. 6, the audio signal output of oscillator 12 will appear as a continuous input in conductor 110 and will be transmitted by means of contacts 102 and 102a to the conductor 96 from which the signal will pass by means of contact bar 91 to those of the switch contacts 99 in engagement therewith and to pass by means of conductors 73 to the selected contact segments 70 of the identification signal keyer device so that the signal input will be keyed by the roller contact 82 to appear in conductor 78 as the desired identification signal. The keyed signal current may then pass by means of conductor 116 to contacts 36 and 39 of the cam actuated switches 34 and 37 so that the identification signal will follow the transmission of a group of A and N signals in a manner similar to that of the prior art, with the exception that the identification signal keyer device may be set to give any desired signal in the manner as previously described.

The audio signal output of oscillator 12 will also be conducted by means of rotatable switch contact 106 and stationary contact 106a and conductor 112 to the A-N keyer device 31 to be keyed to give the A and N signals which will be transmitted through conductors 40 and 41 and amplified in the conventional manner. With the switch 100 in the first position it will be understood that while the identification signal keyer roller 82 is rotating continuously to put a keyed signal into conductor 78, the identification signal will not be fed to the amplifier and mixer 13 until switch contacts 34 and 37 engage the identification signal contacts 36 and 39, respectively, in the manner well known in the art.

When the switch 100 is actuated to a second position such as illustrated in Fig. 7, only radio range signals will be transmitted so that if desired the instructor may alter the setting of the keys 85 to send an identification signal, and in the interim the student will not be confused during the changing of identification signals. In the circuit arrangement as shown in this figure, the audio input signal from conductor 110 passing from contact 102 can not pass onward to the keyer device because of contact 102 engaging the electrically dead contact 102b so that the audio signal may travel only by way of contacts 106 and 106b through conductor 112 to the A-N signal keyer 31 from whence the keyed audio A-N signals will traverse a path from contacts 32 to 33, as indicated by arrows, to ultimately pass independent of cam actuated switches 34 and 37 to conductors 40 and 41 and from thence to the mixer tube 13. It will thus be seen that with the circuit arrangement of Fig. 7, the identification signal keyer device is rendered inoperative and radio range signals will be transmitted to the student occupant of the trainer.

As previously mentioned, it is desirable to be able to simulate the signals given by radio compass homing marker stations and this may be accomplished by setting certain of the keys 85 to correspond to the homing marker identification signals and placing switch 100 into a third position such as illustrated in Fig. 8.

As is seen in this figure, the continuous audio signal occurring in conductor 110 may pass from contacts 102 and 102c to the identification signal keyer. The keyed signal from the identification signal keyer will be transmitted from conductor 78 to contacts 107c and 108c from whence the signal will travel by means of contacts 107 and 108 through conductors 113 and 117, respectively, to be transmitted directly to conductors 40 and 41 so that the homing marker identification signal will be heard continuously in the headphones worn by the student. It will be noted that contact 106 in the third position of the switch as shown engages dead contact 106c, which prevents the audio oscillator signal output from traveling by way of conductor 112 to the radio range keyer, which is thus rendered inoperative.

While the rotary identification signal keyer device has been illustrated and described with reference to a manually actuated radio signal chassis, it will be apparent that this device is equally applicable to the automatic miniature radio range transmitter such as disclosed in Melvin and White Patent No. 2,352,216 so that the radio signal field will be keyed to give any desired identification signal in the same manner as the identification signals are formed as herein described. It will also be apparent that if so desired a key controlled rotary switch of the character here disclosed may be employed for forming the A-N signals and readily changed from radio range character signals employed in the United States to any other interlocking signal combination such as E and T employed in foreign countries. Also by means of the double key bank arrangement illustrated in Fig. 6 special marker or other type of identification signals may be sent and thus eliminate entirely the cam actuated keyers now employed in aviation ground training apparatus.

While a preferred embodiment of the invention has been illustrated and described, various changes and modifications therein will become apparent to those skilled in the art as falling within the scope of the invention as defined in the appended claims.

We claim:

1. In a signalling apparatus for aviation ground training apparatus of the type including an audiofrequency generator, a keying means for keying the output of said generator to produce signals simulating radio navigational signals, and means for transmitting the keyed signals to the student; an improved keying means comprising an interlocked signal keyer and an identification signal keyer, timing switch means for rendering said keyers alternately operative for predetermined periods of time and control switch means for selectively rendering either of said keyer devices operative to transmit keyed signals to said amplifying means independently of the operation of said timing switch means, said identification signal keyer comprising a stationary element and a rotatable element driven at a constant speed, one element having a plurality of concentric contact segments thereon and the other element having a single contact adapted to sequentially engage each of said plurality of contact segments upon relative rotation of said elements, a plurality of independent key actuated switches corresponding in number to the number of contact segments, said switches being connected in parallel to the output of said audio frequency generator and each connected to an individual one of said contact segments and an electrical connection between the single contact of the other element and said signal amplifying means, whereby, when selected one of said key actuated switches are closed, relative rotation of said keyer elements will cause the output of said audio frequency generator to be keyed in pulses corresponding to a desired radio code signal, said key actuated switches having the keys thereof arranged in a single row in parallel relation, each of said keys having an indicating or flag portion which is visible only when the key is in switch closing position whereby the arrangement of the visible portions of the keys produces a pictorial representation in dots and dashes of the code signal being keyed by the identification signal keyer.

2. In a signalling apparatus for aviation ground training apparatus of the type including an audiofrequency generator, a keying means for keying the output of said generator to produce signals simulating radio navigational signals, means for amplifying the keyed signals, and means for transmitting the keyed signals to the student; an improved keying means comprising an interlocked signal keyer and an identification signal keyer, timing switch means for rendering said keyers alternately operative for predetermined periods of time and control switch means for selectively rendering either of said keyer devices operative to transmit keyed signals to said amplifying means independently of the operation of said timing switch means, said identification signal keyer comprising a constant speed drive shaft, a plurality of closely spaced contact elements positioned along the circumference of a circle concentric with said shaft, a rotatable contact element driven by said shaft, and a selectively and independently operable means individual to each of said plurality of contact elements, each of said means when operated acting to allow a circuit to be completed through its corresponding contact element between said signal generator and said amplifier upon rotation of said rotatable contact, whereby said plurality of contacts may be electrically grouped for the production of a desired combination of dash-dot code signals, key actuating means for each of said selectively and independently operable means, said keys being arranged in a single row in parallel relation, each of said keys having an indicating or flag portion which is visible only when the key is in its operated position whereby the arrangement of the visible portions of the keys produces a pictorial representation in dots and dashes of the code signal being keyed by the identification signal keyer.

HAROLD H. CHARLES.
HERBERT P. BEHLEN.

REFERENCES CITED

The following references are of record in the file of this patent:

UNITED STATES PATENTS

| Number | Name | Date |
| --- | --- | --- |
| 1,976,548 | Field | Oct. 9, 1934 |
| 2,140,138 | Miller | Dec. 13, 1938 |
| 2,334,574 | Neiswinter | Nov. 16, 1943 |
| 2,350,551 | Fish et al. | June 6, 1944 |
| 2,411,191 | Burcky | Nov. 19, 1946 |